United States Patent [19]
Saito et al.

[11] Patent Number: 5,944,765
[45] Date of Patent: Aug. 31, 1999

[54] CONTROL SYSTEM FOR INTERNAL COMBUSTION ENGINES FOR VEHICLES

[75] Inventors: Yoshiharu Saito; Kazutomo Sawamura; Ryuuji Kouno, all of Wako, Japan

[73] Assignee: Honda Giken Kogyo Kabushiki Kaisha, Tokyo, Japan

[21] Appl. No.: 08/848,527

[22] Filed: Apr. 28, 1997

[30] Foreign Application Priority Data

Apr. 30, 1996 [JP] Japan .................................... 8-132772

[51] Int. Cl.⁶ ........................................................ G06G 7/70
[52] U.S. Cl. .............................. 701/54; 701/53; 701/101; 477/109
[58] Field of Search .................................. 701/51, 53, 54, 701/59, 60, 101, 102; 477/43, 44, 109, 115, 110, 121, 154, 159, 143, 158; 123/564, 399, 492

[56] References Cited

U.S. PATENT DOCUMENTS

| | | | |
|---|---|---|---|
| 5,086,668 | 2/1992 | Fujiwara et al. | 477/161 |
| 5,101,786 | 4/1992 | Kamio et al. | 123/399 |
| 5,109,826 | 5/1992 | Kato | 123/564 |
| 5,119,696 | 6/1992 | Yamaguchi | 477/109 |
| 5,476,425 | 12/1995 | Shiraishi et al. | 477/109 |
| 5,613,920 | 3/1997 | Uno et al. | 477/109 |
| 5,658,217 | 8/1997 | Tsukada | 477/109 |
| 5,709,629 | 1/1998 | Minowa et al. | 477/120 |
| 5,759,134 | 6/1998 | Kuriyama | 477/158 |
| 5,772,554 | 6/1998 | Tabata | 477/109 |

*Primary Examiner*—Jacques H. Louis-Jacques
*Attorney, Agent, or Firm*—Armstrong, Westerman, Hattori, McLeland & Naughton

[57] ABSTRACT

A control system for an internal combustion engine for a vehicle operable during gear shifting of the automatic transmission effected when the accelerator pedal of the vehicle has been depressed, for changing the output torque of the engine to reduce a shock generated during the gear shifting. Required output torque of the engine for performing the gear shifting is calculated based on a gear shifting duration from the time the gear shifting is started to the time hydraulic pressure for operating a clutch of a lower-speed position of the clutches to be selected by the gear shifting rises. A torque correction amount is calculated based on the difference between the calculated required output torque of the engine and the actual output torque of the engine assumed during the gear shifting. When the gear shifting is started, the output torque of the engine is increased based on the calculated torque correction amount.

6 Claims, 10 Drawing Sheets

CONTROL SYSTEM FOR INTERNAL COMBUSTION ENGINES FOR VEHICLES

BACKGROUND OF THE INVENTION

1. Field of the Invention

This invention relates to a control system for internal combustion engines for vehicles, which is capable of reducing a shock generated during a so-called power-on downshift of an automatic transmission of the engine, i.e. a downshift taking place when an accelerator pedal of the vehicle has been depressed.

2. Description of the Related Art

Conventionally, to reduce a shock generated during a power-on downshift of an automatic transmission of an automotive vehicle, there are known control systems for internal combustion engines for vehicles. One of such control systems changes hydraulic pressure supplied to a clutch of a target speed position (lower-speed clutch), based on the rotational speed of the engine assumed just before the downshift. Another control system instantaneously lowers the output torque of the engine by retarding the ignition timing of the engine at a timing when the downshift is almost completed. Still another control system delays the downshift-starting time point so as to start the downshift under predetermined conditions. These control systems are all intended to prevent an excessive increase in the engine rotational speed immediately after the downshift.

However, the above known control systems have the following disadvantages: That is, when a downshift is performed in a low vehicle speed region, the difference in engine rotational speed between before and after the downshift is so small that the downshift is completed in a very short time period (downshift duration), and therefore the hydraulic pressure supplied to the target speed position (lower-speed) clutch cannot sufficiently rise within the very short time period. In such a case, even if the hydraulic pressure supplied to the target speed position clutch is changed to a higher pressure or the ignition timing is retarded, a shock caused by the downshift cannot be reduced. Further, if the downshift-starting point is delayed until the hydraulic pressure supplied to the target speed position clutch rises, it can give a delayed, disjointed control; feeling to the driver.

SUMMARY OF THE INVENTION

It is the object of the present invention to provide a control system for internal combustion engines for vehicles, which is capable of reducing a shock generated during gear shifting by properly increasing the output torque of the engine at the start of the gear shifting.

To attain the above object, the present invention provides a control system for an internal combustion engine for a vehicle having an accelerator pedal, the engine having an automatic transmission including a gear mechanism having a plurality of clutches, the control system being operable during gear shifting of the automatic transmission effected when the accelerator pedal has been stepped on, for changing output torque of the engine to reduce a shock generated during the gear shifting, the control system comprising:

engine output torque-calculating means for calculating the required output torque of the engine for performing the gear shifting, based on a gear shifting duration from a time the gear shifting is started to a time hydraulic pressure for operating a clutch of a lower-speed position of the clutches to be selected by the gear shifting rises;

torque correction amount-calculating means for calculating a torque correction amount, based on a difference between the required output torque of the engine calculated by the engine output torque-calculating means and actual output torque of the engine assumed during the gear shifting; and engine output torque-increasing means for increasing the output torque of the engine when the gear shifting is started, based on the torque correction amount calculated by the torque correction amount-calculating means.

Preferably, the engine output torque-calculating means calculates the required output torque of the engine, based on the rotational speed of the engine and the traveling speed of the vehicle assumed at the start of the gear shifting.

More preferably, the engine output torque-calculating means includes total inertia-calculating means for calculating a total inertia required for the gear shifting, the engine output torque-calculating means setting the required output torque of the engine to a value based on the total inertia calculated by the total inertia-calculating means, the gear shifting duration, and engaging forces of the clutch of the lower-speed position and a clutch selected before the gear shifting.

More preferably, the total inertia-calculating means calculating the total inertia, based on a difference in rotational speed of the input side of the automatic transmission, between before and after the gear shifting and a difference in the rotational speed of the engine between before and after the gear shifting.

Still more preferably, the total inertia-calculating means calculates the rotational speed of the output side of the automatic transmission, based on the traveling speed of the vehicle, calculates the difference in the rotational speed of the input side between before and after the gear shifting, based on the rotational speed of the output side and change gear ratios of the gear mechanism assumed before and after the gear shifting, and calculates the rotational speed of the engine assumed after the gear shifting, based on the rotational speed of the input side assumed after the gear shifting.

Advantageously, the engaging forces of the clutch and the clutch selected before the gear shifting is determined according to the traveling speed of the vehicle.

With the above arrangement, a shock generated during gear shifting can be reduced by properly increasing the output torque of the engine at the start of the gear shifting. Especially, even when a downshift is performed in a low vehicle speed region where gear shifting is completed in a very short time period, the output torque of the engine can be increased to an optimal value depending on the rise in the hydraulic pressure applied to the target speed position (lower-speed position) clutch. Thus, a shock caused by gear shifting can be reduced without causing over-speeding of the engine rotational speed, and further the drivability can be improved without delaying the gear-shifting-starting point.

The above and other objects, features and advantages of the invention will become more apparent from the following detailed description taken in conjunction with the accompanying drawings.

BRIEF DESCRIPTION OF THE DRAWINGS

FIGS. 6A to 6J collectively form a timing chart showing transient characteristics exhibited by the engine and the control system according to the embodiment during a downshift, in which:

DETAILED DESCRIPTION OF A PREFERRED EMBODIMENT

The invention will now be described in detail with reference to the drawings showing a preferred exemplary embodiment thereof.

Figure 1:
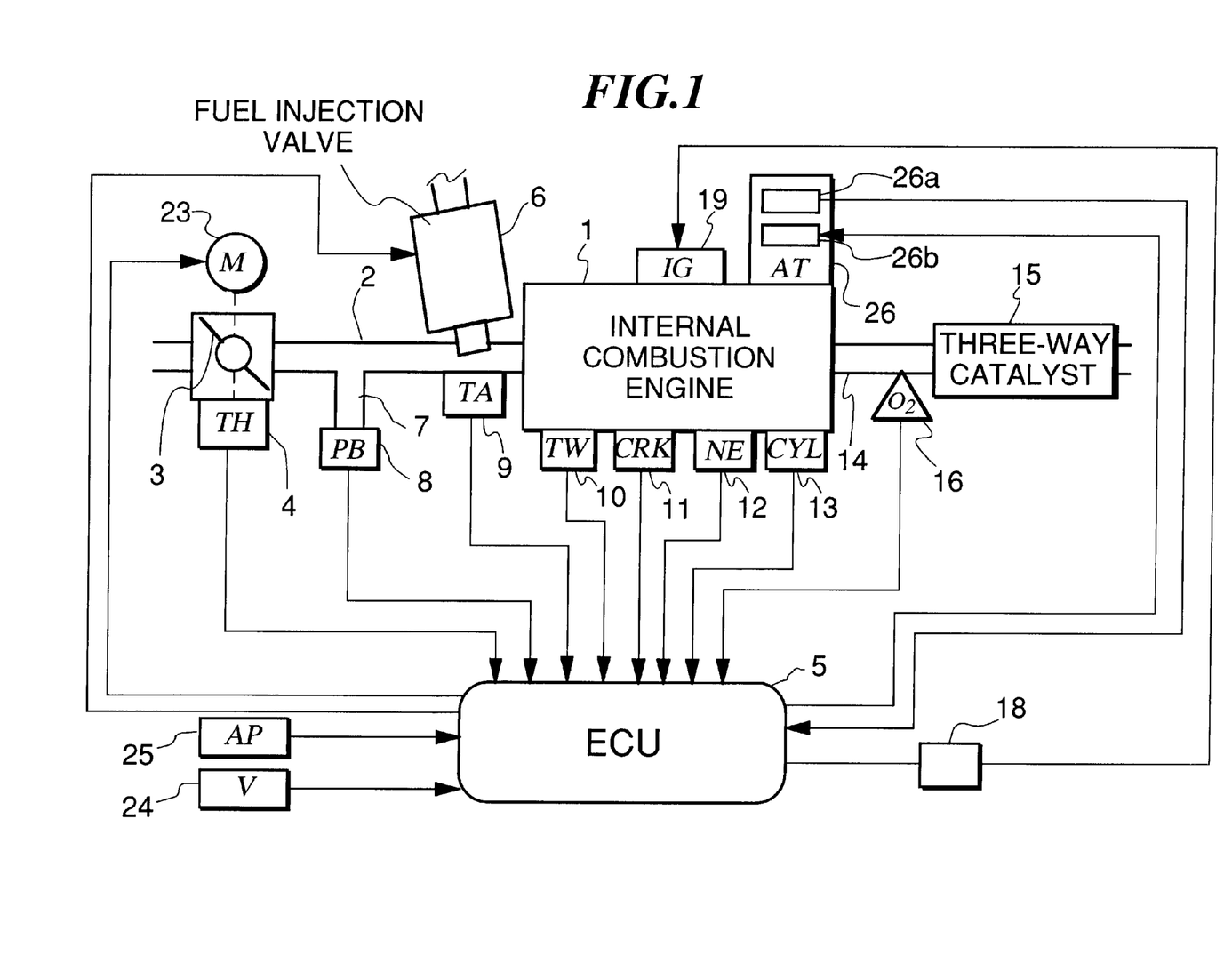
FIG. 1 is a block diagram schematically showing the whole arrangement of an internal combustion engine and a control system therefor, according to an embodiment of the invention.

Referring first to FIG. 1, there is illustrated the entire arrangement of an internal combustion engine (hereinafter simply referred to as "the engine") and a control system therefor, according to the preferred exemplary embodiment of the invention.

In the figure, reference numeral 1 designates an internal combustion engine, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for generating an electric signal indicative of the sensed throttle valve opening TH to the ECU 5.

Further electrically connected to the ECU 5 are a throttle actuator 23 for driving the throttle valve 3 and an accelerator pedal position (AP) sensor 25 for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electrical signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18. Further connected to the ECU 5 is a conventional automatic transmission 26 including a torque converter with a lock-up clutch, a gear mechanism, a main shaft, and a counter shaft, none of which is shown, and further provided with a hydraulic pressure control circuit 26b for controlling the operations of the lock-up clutch and the gear mechanism of the transmission, and a gear position sensor 26a for detecting the shift position of the gear mechanism. The hydraulic pressure control circuit 26b and the gear position sensor 26a are electrically connected to the ECU 5. The hydraulic pressure control circuit 26b drives gear-sifting linear solenoid valves, not shown, of the gear mechanism, for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) of a vehicle in which the engine 1 is installed and supplying a signal indicative of the sensed vehicle speed V to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which supplies driving signals to the fuel injection valves 6, the distributor 18, the throttle actuator 23, etc., and also supplies control signals to the hydraulic control circuit 26.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$Tout = Ti \times KO2 \times K1 + K2 \tag{1}$$

where Ti represents a basic value of the fuel injection period Tout, which is determined according to the engine rotational speed NE and the intake pipe absolute pressure PBA, by the use of a Ti map, not shown, and stored in the memory means.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Further, the CPU of the ECU 5 calculates the ignition timing $\theta IG$ of the engine, based on the determined engine operating conditions. Driving signals corresponding to the TOUT and $\theta IG$ values calculated as above are delivered via the output circuit to the fuel injection valves 6 and the spark plugs 19, respectively, to drive them.

Further, the CPU controls the engaged state of the lock-up clutch, the shift position of the gear mechanism, the valve opening TH of the throttle valve 3 in response to output signals from various engine operating parameter sensors.

Figure 2:
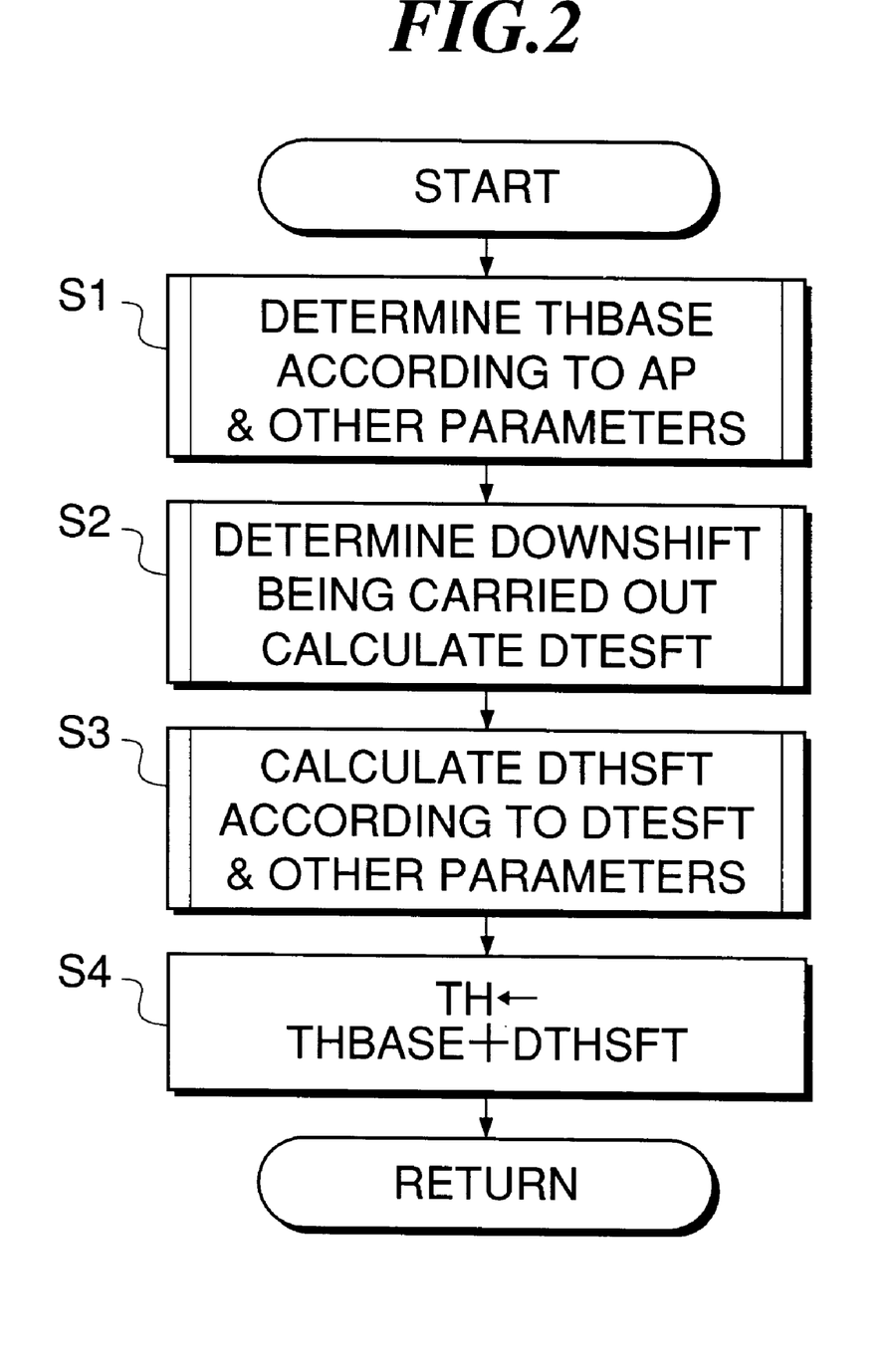
FIG. 2 is a main routine for controlling the output torque of the engine, which is executed by an ECU appearing in FIG. 2.
Figure 3:
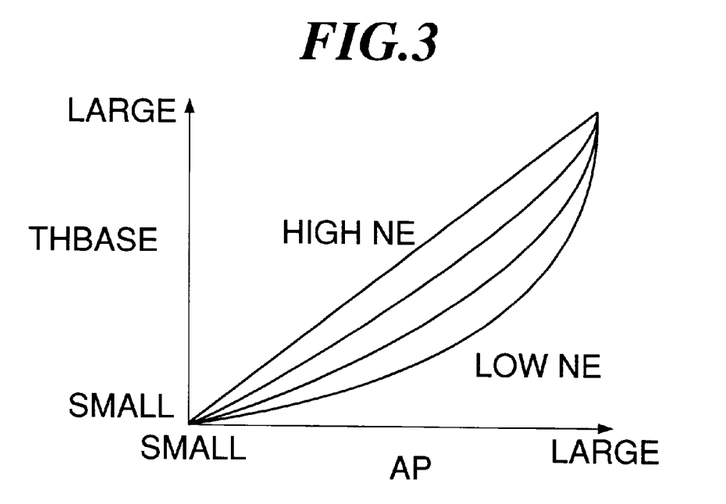
FIG. 3 is a graph showing the relationship between a basic value THBASE of the throttle valve opening TH, an accelerator pedal position AP, and engine rotational speed NE.
Figure 4:
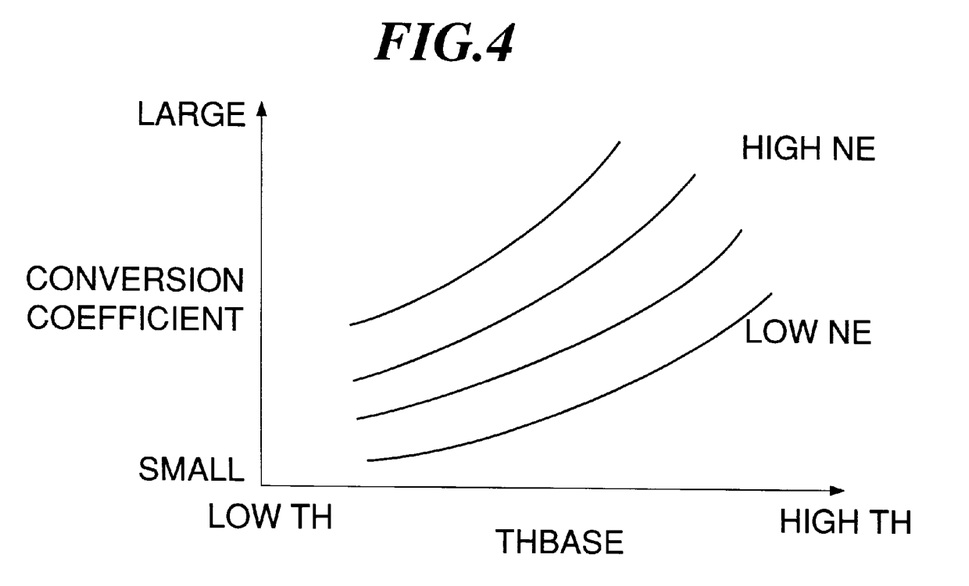
FIG. 4 is a graph showing the relationship between a conversion coefficient, the engine rotational speed NE, and the basic throttle valve opening THBASE.

FIG. 2 shows a main routine for carrying out engine output torque control processing, which is executed by the ECU 5. This processing is repeatedly executed at predetermined time intervals set by a timer, not shown. First, at a step S1, a basic value THBASE of the throttle valve opening TH is determined according to the accelerator pedal position AP and the engine rotational speed NE. FIG. 3 is a graph showing the relationship between the basic throttle valve opening THBASE, the accelerator pedal position AP, and the engine rotational speed NE.

Then, it is determined at a step S2 whether or not a downshift of the automatic transmission 26 is being carried out due to depressing of the accelerator pedal, from outputs from the accelerator pedal position sensor 25 and the gear position sensor 26a. Then, a torque correction amount DTESFT for reducing a shock caused by a downshift is calculated depending on the result of the determination. When a downshift is being carried out due to depressing of the accelerator pedal, the torque correction amount DTESFT is calculated in response to gear-shifting conditions which change every moment according to the speed position SFT, the output torque of the engine (engine rotational speed NE and intake pipe absolute pressure PBA), the change gear ratio of the transmission, the vehicle speed V, etc. Processing for calculating the torque correction amount DTESFT will be described hereinafter.

When a downshifting command is issued and delivered to the hydraulic pressure control circuit 26 from the CPU of the ECU 5, based on the outputs from the accelerator pedal position sensor 25 and the gear position sensor 26a, gear-shifting linear solenoid valves of the gear mechanism are driven based on gear-shifting conditions (third-speed position→second-speed position, fourth-speed position→second-speed position, etc.). However, a delay time exists between the time the linear solenoid valve for the clutch of the target speed position starts to be driven and the time the operating hydraulic pressure actually rises. In the torque correction amount DTESFT-calculation, the torque correction amount DTESFT is basically set to a positive value at the beginning of a downshift which increases the change gear ratio of the automatic transmission 26, so as to increase the engine output torque. On the other hand, when the downshift is completed, the value DTESFT is set to a negative value so as to decrease the engine output torque and then progressively returned to 0, to thereby reduce a shock caused by the downshift. When the torque correction amount DTESFT is equal to 0, the throttle valve opening TH is not substantially changed. When the torque correction amount DTESFT is greater than 0, an increase in the engine output torque is demanded, while when the torque correction amount DTESFT is less than 0, a decrease in the engine output torque is demanded.

Figure 5:
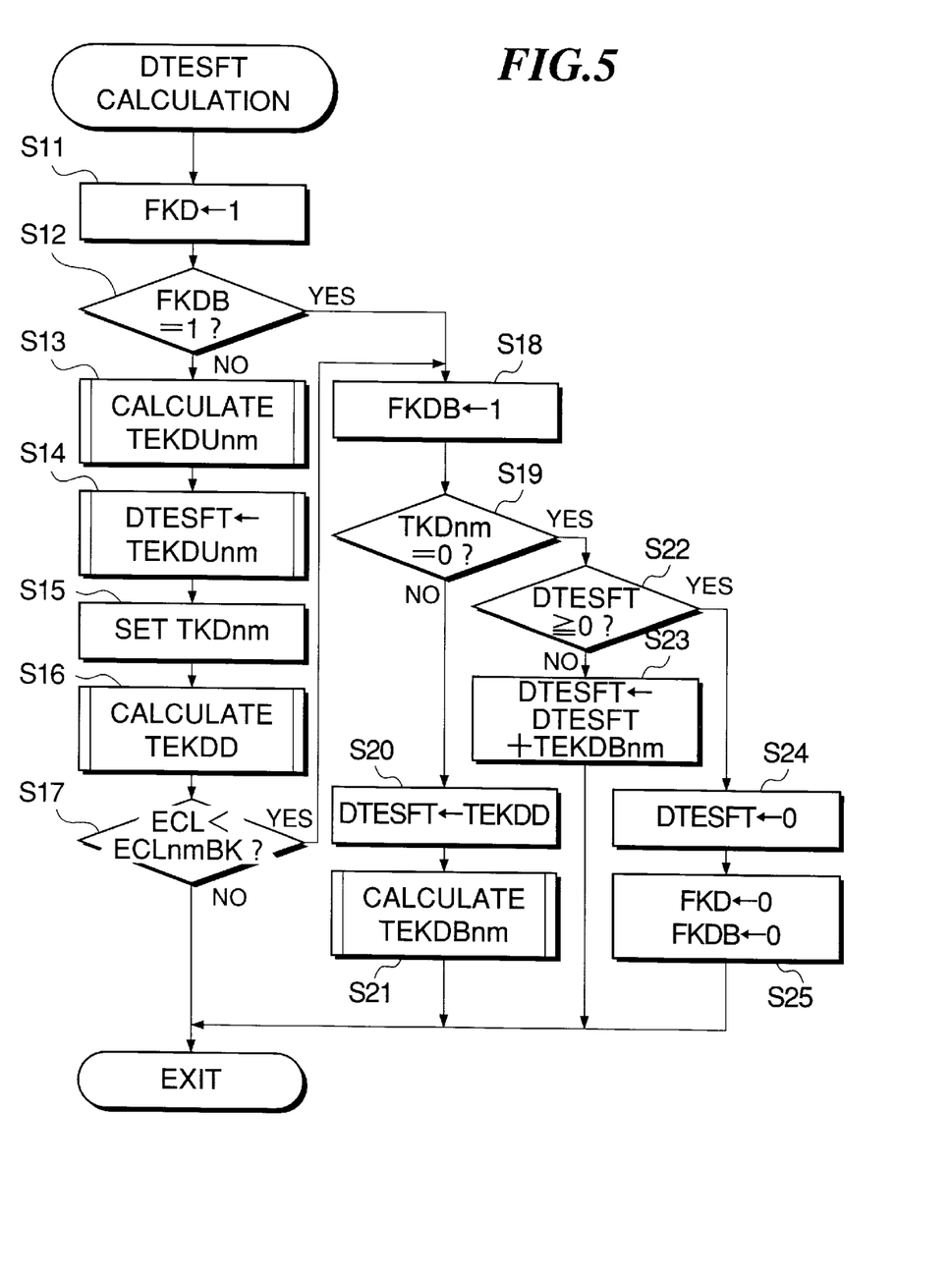
FIG. 5 is a flowchart showing a subroutine for calculating a torque correction amount DTESFT employed during a downshift, which is executed at a step S2 in FIG. 2.
Figure 6A:
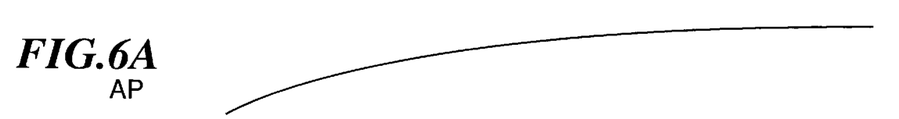
FIG. 6A shows a change in an accelerator pedal position AP.
Figure 6B:
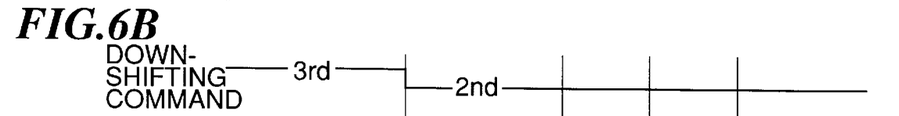
FIG. 6B shows a gear-shifting command signal.
Figure 6C:
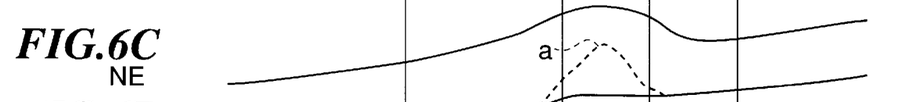
FIG. 6C shows a change in the engine rotational speed NE.
Figure 6D:
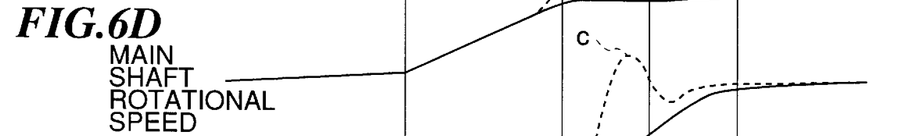
FIG. 6D shows a change in the rotational speed of a main shaft of an automatic transmission appearing in FIG. 1.
Figure 6E:
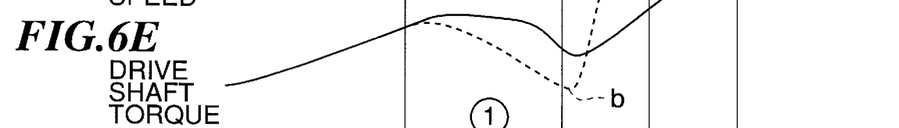
FIG. 6E shows a change in the torque of a drive shaft of the vehicle.
Figure 6F:
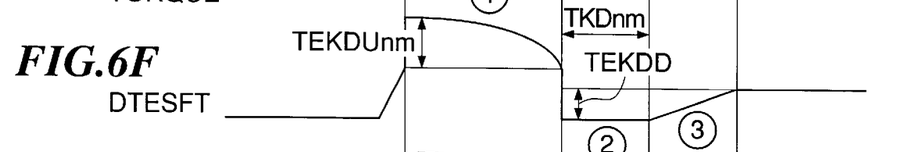
FIG. 6F shows a change in the torque correction amount DTESFT.
Figure 6G:
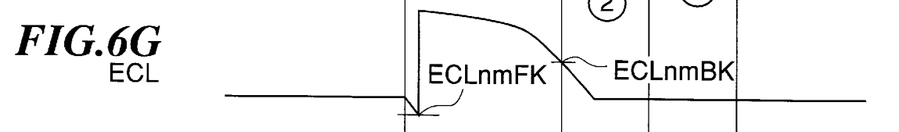
FIG. 6G shows a change in an input/output rotational speed ratio ECL.
Figure 6H:
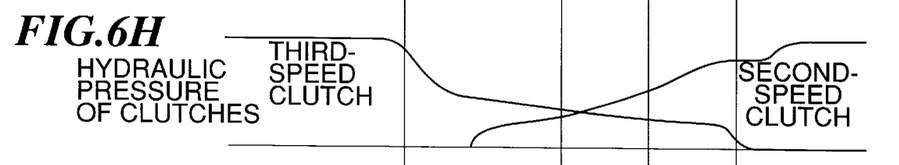
FIG. 6H shows changes in hydraulic pressure values of a second speed clutch and a third speed clutch of the automatic transmission appearing in FIG. 1.
Figure 6I:
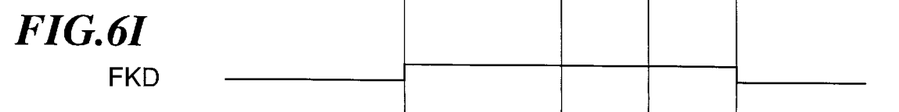
FIG. 6I shows a change in a flag FKD.
Figure 6J:
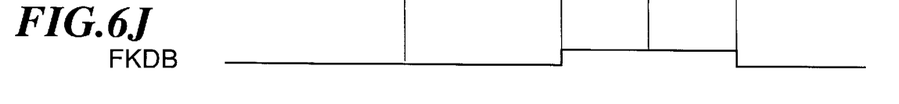
FIG. 6J shows a change in a flag FKDB.

At a step S3, a throttle valve opening correction amount DTHSFT is calculated based on the torque correction amount DTESFT calculated at the step S2. More specifically, the throttle valve opening correction amount DTHSFT is obtained by multiplying the torque correction amount DTESFT by a conversion coefficient which is retrieved from a map according to the engine rotational speed NE and the basic throttle valve opening THBASE. FIG. 5 shows the map for determining the conversion coefficient. The conversion coefficient is set to a larger value as the engine rotational speed NE becomes higher and/or the basic throttle valve opening THBASE becomes larger.

Then, throttle valve control is carried out at a step S4. More specifically, the throttle valve opening TH is set to a value obtained by adding the throttle valve opening correction amount DTHSFT to the basic throttle valve opening THBASE, followed by terminating the present routine. Thus, the throttle valve 3 is driven to the set throttle valve opening TH through the throttle actuator 23.

FIG. 5 shows a subroutine for carrying out the torque correction amount DTESFT-calculating processing during a downshift, which is executed at the step S2 in FIG. 2. FIGS. 6A to 6I collectively show the relationship in timing between the accelerator pedal position AP, the engine rotational speed NE, the torque of a drive shaft of the vehicle, the torque correction amount DTESFT, an input/output rotational speed ratio ECL, and hydraulic pressures of clutches of the automatic transmission, which are assumed during a downshift (third-speed position→second-speed position). The input/output rotational speed ratio ECL is a ratio of the rotational speed of a wheel-side output shaft (counter shaft) of the automatic transmission 26 to the rotational speed of an engine-side input shaft (main shaft) of the same.

First, at a step S11 in FIG. 5, a flag FKD is set to "1", to indicate that a downshift upon stepping-on of the accelerator pedal is being carried out. Then, it is determined at a step S12 whether or not a flag FKDB which, when set to "1", indicates that the input/output rotational speed ratio ECL is smaller than a predetermined value ECLnmBK, referred to hereinafter, is set to 1. If the flag FKDB is not set to "1", a torque increment TEKDUnm, referred to below, is calculated at a step S13, and the torque correction amount DTESFT is set to the thus calculated torque increment TEKDUnm at a step S14. This setting is for increasing the engine output torque to suppress a drop in the driving force in a so-called inertia phase, indicated by a state 1 in FIG. 6, in which a clutch of the original speed position (third-speed position) starts to slip so that the engine rotational speed NE rises.

Figure 7:
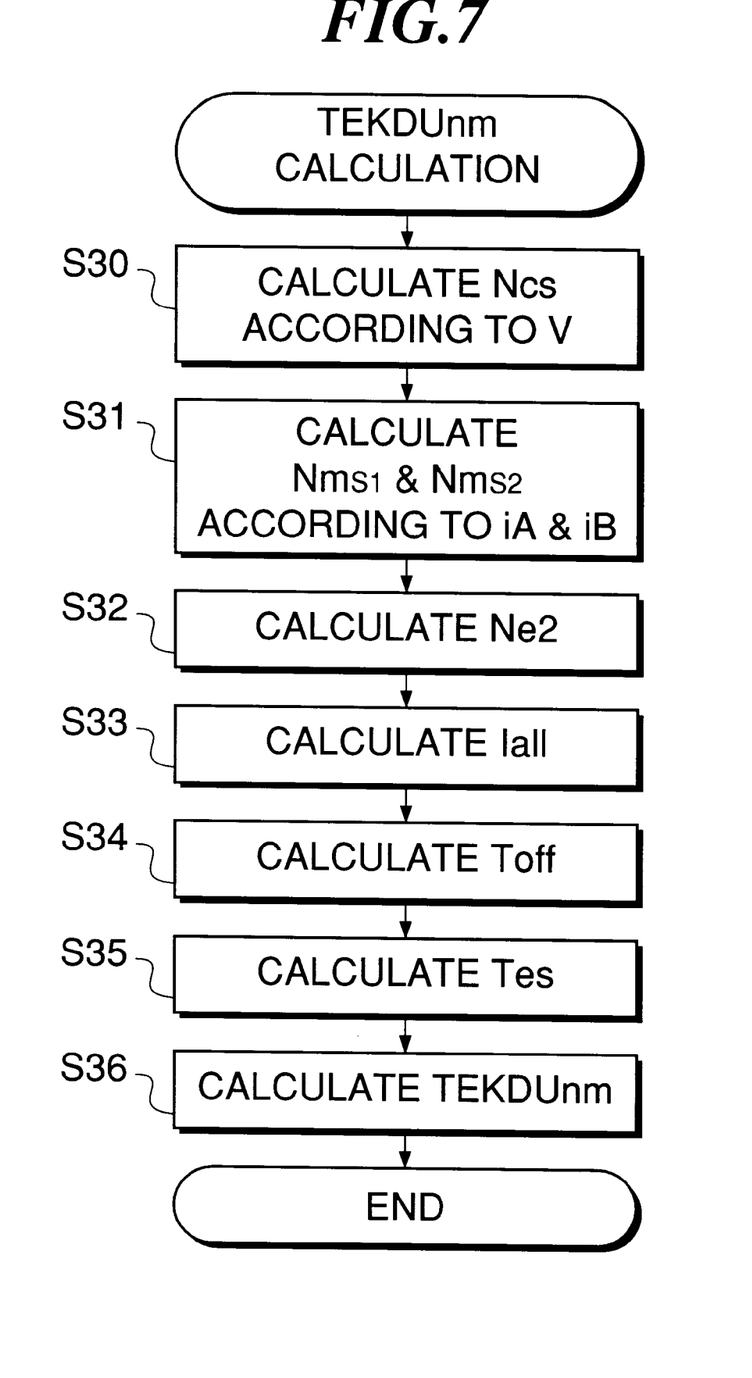
FIG. 7 is a flowchart showing a subroutine for calculating a torque increment TEKDUnm, which is executed at a step S13 in FIG. 5.

Next, a description will be made of a manner of calculation of the torque increment TEKDUnm at the step S13. FIG. 7 shows a subroutine for calculating the torque increment TEKDUnm. First, at a step S30, the ECU 5 reads in the vehicle speed V (km/h) from the vehicle speed sensor 24, and the rotational speed Ncs (rad/s) of the counter shaft is calculated by the use of the following equation (2):

$$Ncs = V \times 1/3.6 \times if \times 1/r \quad (2)$$

where r represents the radius of wheels of the vehicle, and if the change gear ratio.

At a step S31, a rotational speed Nms1 of the main shaft before the downshift and a rotational speed Nms2 of the same after the downshift are calculated based on the rotational speed Ncs of the counter shaft calculated at the step S30 and a change gear ratio iA before the downshift, and the rotational speed Ncs and a change gear ratio iB after the downshift, by the use of the following equations (3) and (4):

$$Nms1 = Ncs \times iA \quad (3)$$

$$Nms2 = Ncs \times iB \quad (4)$$

At a step S32, a rotational speed Ne2 of the engine after the downshift is calculated based on the main shaft rotational speed Nms2 calculated at the step 31, by the use of the following equation (5):

$$Ne2 = Nms2 \times \alpha \quad (5)$$

where α represents the reciprocal of a slip factor of the torque converter, which is known, e.g. as 1/0.9 (=1.1).

At a step S33, a total inertia Iall required for the downshift is calculated based on the rotational speeds Nms1 and Nms2 of the main shaft before and after the downshift, the engine rotational speed Ne2 after the downshift, and a rotational speed Ne1 of the engine at the start of the downshift, by the use of the following equation (6):

$$Iall = Ieng(Ne2 - Ne1) + Ims(Nms2 - Nms1) \quad (6)$$

where Ieng and Ims represent the inertial moment of the engine and the inertial moment of the main shaft, respectively.

Figure 8:
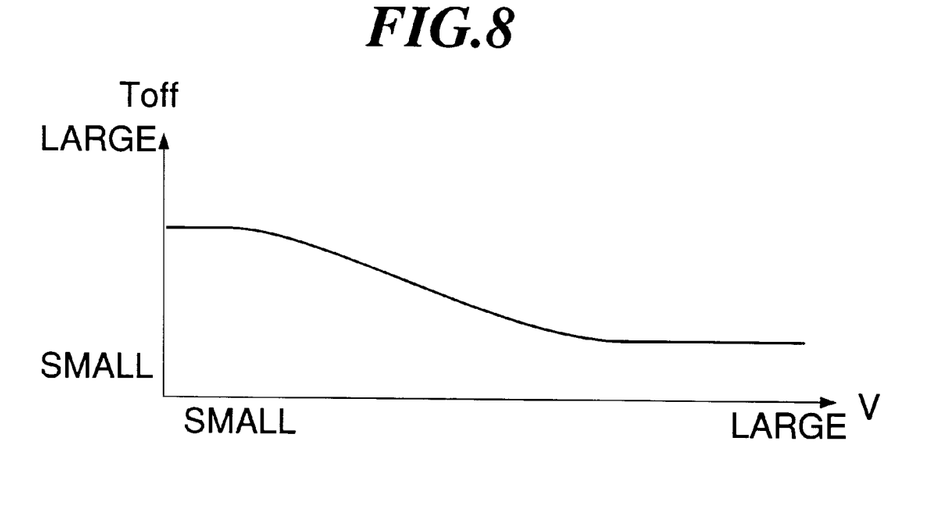
FIG. 8 shows a table for determining a clutch engaging force Toff according to the vehicle speed V.

Then, at a step S34, a total engaging force Toff of the clutches is determined from a table, shown in FIG. 8, according to the vehicle speed V. The total clutch engaging force Toff is determined by the magnitude of torque applied to the clutches, which is set to a smaller value as the vehicle speed become larger.

Further, an output torque Tes of the engine required for performing the downshift is calculated by the use of the following equation (7):

$$Tes = Iall/ts + Toff \quad (7)$$

where ts represents a downshift duration, which is a time period from the start of the downshift to the time the hydraulic pressure for operating the target speed position (lower-speed position) clutch rises to a sufficient level. The downshift duration ts is set to a value corresponding to a rise time of the hydraulic pressure applied to the target speed position (lower-speed position) clutch during the downshift.

Figure 9:
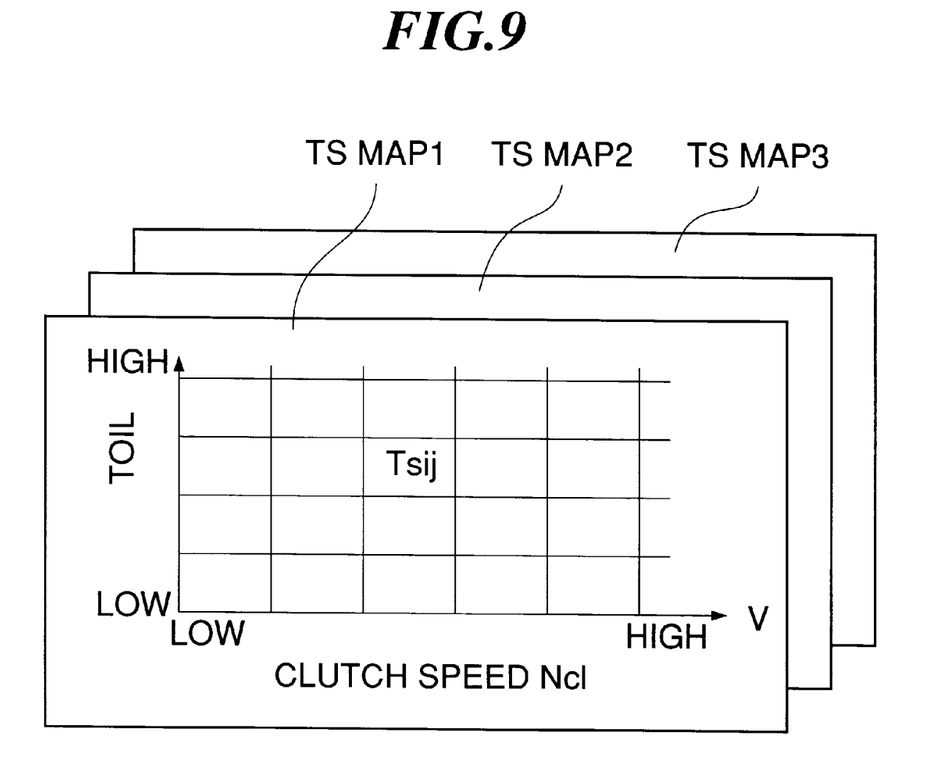
FIG. 9 shows maps each for determining a downshift duration according to clutch speed Ncl and temperature Toil of a hydraulic oil for operating a target speed position clutch.

More specifically, the downshift duration ts is determined according to maps of FIG. 9. As shown in the figure, three maps Ts1, Ts2, and Ts3 are provided, which are selected depending on a time interval Tint, i.e. a time period from the time the target speed position clutch was last released or disengaged to the time the target speed position clutch has been engaged this time. More specifically, if the time interval Tint is smaller than a first predetermined value Tint1 (Tint<Tint1), the map Ts1 is selected. If Tint1≦Tint<Tint2 (>Tint1) holds, the map Ts2 is selected, while if Tint2≦Tint<Tint3 (>Tint2) holds, the map Ts3 is selected. Each of the maps is retrieved according to the input-side rotational speed Ncl of a clutch of a target speed (lower-speed) position (hereinafter referred to as "the clutch speed Ncl") and the temperature Toil of a hydraulic oil for operating the clutch. In each map, when the hydraulic oil temperature Toil assumes an extremely low value or an extremely high value, the downshift duration ts is set to a long value. On the other hand, when the hydraulic oil temperature Toil falls in a range between the extremely low value and the extremely high value, the downshift duration ts is set to a shorter value as the hydraulic oil temperature Toil is higher. Further, the downshift duration ts is set to a shorter value as the clutch speed Ncl is higher. The clutch speed Ncl is calculated based on the main shaft rotational speed Nms2 after the downshift and the kind of the presently selected clutch. Alternatively of the maps of FIG. 9, which are two-dimensional maps, the downshift duration ts may be determined from a three-dimensional map which is set according to the clutch speed Ncl, the hydraulic oil temperature Toil, and the time interval Tint.

Figure 10:
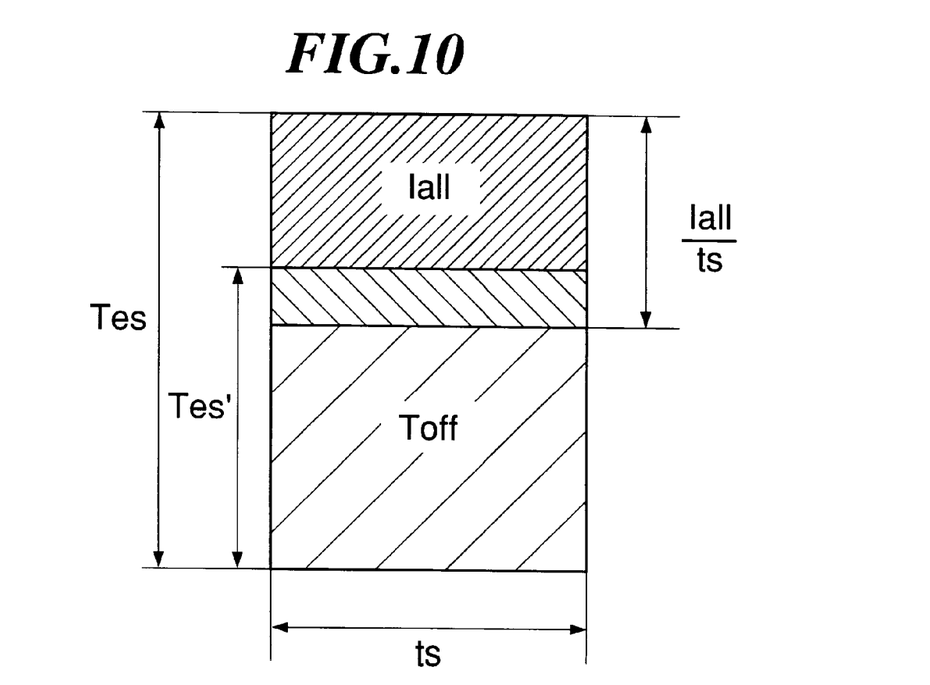
FIG. 10 is a graph showing the relationship between an engine output torque Tes required during the downshift and a time period ts required for the downshift (downshift duration)
Figure 11:
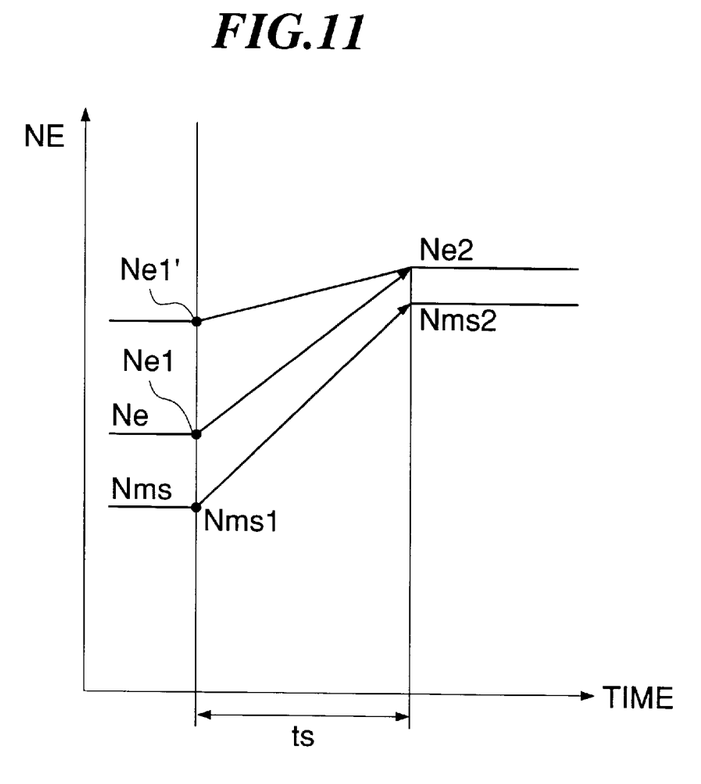
FIG. 11 is a graph showing the relationship between engine rotational speeds Ne1 and Ne2, and main shaft rotational speeds Nms1 and Nms2, plotted with the lapse of the time period ts.

FIG. 10 shows the relationship between the engine output torque Tes required for performing the downshift and the downshift duration ts. As is understood from Iall/ts in FIG. 10, as the downshift duration ts is shorter, the required engine output torque Tes is larger insofar as the total inertial Iall remains constant. FIG. 11 shows the relationship between the engine rotational speeds Ne1 and Ne2 and the main shaft rotational speeds Nms1 and Nms2 with respect to the downshift duration ts. The required engine output torques Tes is determined by the engine rotational speed Ne1 at the start of the downshift, as is understood from the equations (6) and (7). More specifically, if the accelerator pedal is slowly depressed, the engine rotational speed Ne1 has already assumed a high value Ne1' before the start of the downshift, as shown in FIG. 11, and therefore the required engine output torque assumes a small value Tes', as indicated in FIG. 10.

Next, the torque increment TEKDUnm is calculated at a step S36, based on the required engine output torque Tes calculated at the step S35, and a present value Te(t) of the engine output torque Tes, by the use of the following equation (8):

$$TEKDUnm = Tes - Te(t) \quad (8)$$

Figure 12:
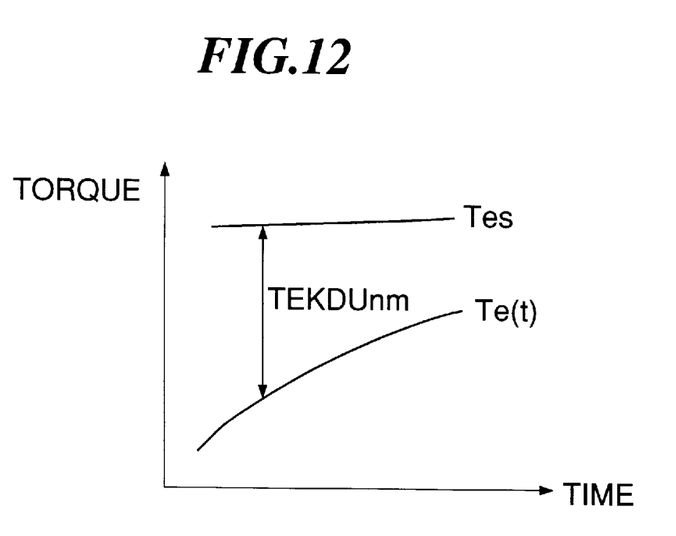
FIG. 12 is a graph showing a change in the torque increment TEKDUnm with the lapse of time.

FIG. 12 is a graph showing a change in the torque increment TEKDUnm with the lapse of time. By repeatedly executing the present subroutine, the torque increment TEKDUnm becomes progressively smaller.

Figure 13:
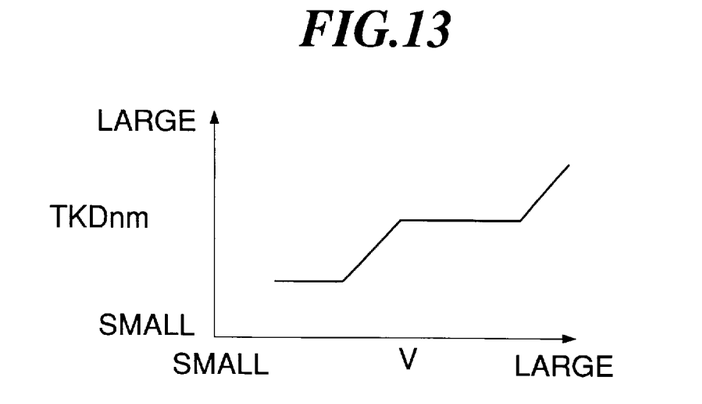
FIG. 13 shows a table for determining the value of a down-counting timer TKDnm according to the vehicle speed V.

After the torque increment TEKDUnm is calculated at the step S13 and then the torque correction amount DTESFT is set to the thus calculated torque increment TEKDUnm at the step S14, the down-counting timer TKDnm is set to a predetermined time period and started at a step S15. The down-counting timer TKDnm counts a time period over which a torque decrement TEKDD, referred to hereinbelow, is to be applied. FIG. 13 shows a table for determining the value of the down-counting timer TKD according to the vehicle speed V. As shown in FIG. 13, the value of the down-counting timer TKD is set to a larger value as the vehicle speed V becomes larger. There are provided six different patterns of this table depending on gear-shifting conditions (fourth-speed position→third-speed position, fourth-speed position→second-speed position, fourth-speed position→first-speed position, third-speed position→second-speed position, third-speed position→first-speed position, and second-speed position→first-speed position).

Next, a torque decrement TEKDD is calculated at a step S16, by the use of the following equation (9):

$$TEKDD = (\text{change gear ratio before downshift/change gear ratio after downshift} - 1) \times DTESFT \times KKD \quad (9)$$

where KKD represents a correction coefficient.

Figure 14:
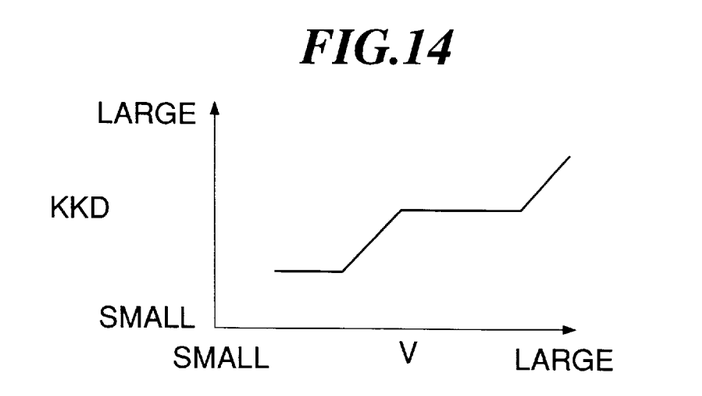
FIG. 14 shows a table for determining a correction amount KKD according to the vehicle speed V.

FIG. 14 shows a table for determining the correction coefficient KKD according to the vehicle speed V. The correction coefficient KKD is set to a larger value as the vehicle speed V becomes larger. There are provided six different patterns of this table depending on the gear-shifting conditions, similarly to the torque increment TEKDUnm.

Then, it is determined at a step S17 whether or not the input/output rotational speed ratio ECL has become smaller than the predetermined value ECLnmBK, which indicates that the rotation of the target speed gear has started to be synchronized with the rotation of the main shaft of the automatic transmission. If the input/output rotational speed ratio ECL has not become smaller than the predetermined value ECLnmBK, the program is immediately terminated.

Figure 15:
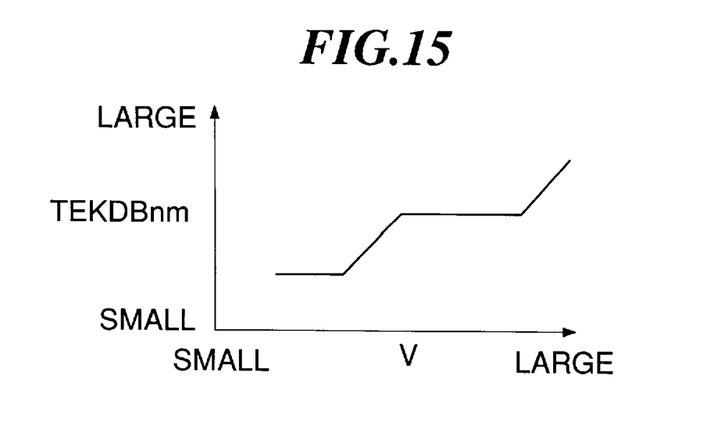
FIG. 15 shows a table for determining an additional torque increment TEKDBnm according to the vehicle speed V.

On the other hand, if the input/output rotational speed ratio ECL has become smaller than the predetermined value ECLnmBK, the flag FKDB is set to "1" at a step S18. Then, it is determined at a step S19 whether or not the value of the down-counting timer TKDnm is equal to 0. If the value of the down-counting timer TKDnm is not equal to 0, the torque correction amount DTESFT is set to the torque decrement TEKDD at a step S20. This setting is for decreasing the engine output torque after completion of the downshift to thereby reduce a shock, as indicated by a state 2 in FIG. 6. Then, at a step S21, an additional torque increment TEKDBnm is calculated, followed by terminating the present routine. FIG. 15 shows a table for determining the additional torque increment TEKDBnm according to the vehicle speed V. The additional torque increment TEKDBnm is set to a larger value as the vehicle speed V becomes larger. There are provided six different patterns of this table depending on the gear-shifting conditions, similarly to the torque increment TEKDUnm.

If the value of the down-counting timer TKDnm is equal to "0" at the step S19, it is determined at a step S22 whether or not the torque correction amount DTESFT is equal to or larger than 0. If the torque correction amount DTESFT is not equal to or larger than 0, the additional torque increment TEKDBnm is added to the torque correction amount DTESFT at a step S23. This addition is for reducing a shock generated after completion of the downshift by progressively returning the torque correction amount DTESFT to 0, as indicated by a state 3 in FIG. 6.

On the other hand, if the torque correction amount DTESFT is equal to or larger than 0 at the step S22, the torque correction amount DTESFT is set to 0 at a step S24, and the flags FKD and FKDB are reset to "0" at a step S25, followed by terminating the present routine.

According to the present embodiment, as described above, when a downshift is started upon depression of the accelerator pedal, the torque correction amount DTESFT is set to the torque increment TEKDUnm to increase the output torque of the engine. As a result, a prompt increase in the engine rotational speed NE can be obtained and hence a drop in the output torque during the inertia phase can be suppressed. Further, when the downshift is completed, the torque correction amount DTESFT is set to the torque decrement TEKDD to decrease the output torque of the engine, and thereafter the additional torque increment TEKDBnm is added to the torque correction amount DTESFT, to thereby progressively return the torque correction amount DTESFT to 0. Thus, the driving force can be smoothly controlled to a value assumed just before the downshift, after completion of the downshift.

In addition, according to the present embodiment, when a downshift is carried out, the engine output torque Tes required for performing the downshift is calculated according to the downshift duration dependent upon the rise time of the hydraulic pressure for operating the target speed (lower-speed) clutch. This positively prevents the disadvantage with the conventional control system, which, when a downshift is completed in a very short time period (downshift duration) in a low vehicle speed region, increases the output torque of the engine though the hydraulic pressure for operating the target speed position (lower-speed position) clutch has not yet sufficiently risen, that the increase of the engine output torque can cause blowing-up of the main shaft rotational speed, as indicated by the broken line a in FIG. 6D, and hence a drop and/or a sharp increase in the driving force immediately after completion of the downshift, as indicated by the broken lines b and c of FIG. 6E.

Further, according to the present embodiment the downshift-starting point need not be delayed until the hydraulic pressure of the target speed position (lower-speed position) clutch rises, which prevents a delayed, disjointed feeling from being given to the driver.

Although in the above described embodiment the engine output torque is controlled by regulating the throttle valve opening, this is not limitative. Alternatively, the engine output torque may be controlled by regulating the retard amount of the ignition timing, to achieve substantially the same results.

What is claimed is:

1. A control system for an internal combustion engine for a vehicle having an accelerator pedal, said vehicle having an automatic transmission including a gear mechanism having a plurality of clutches, said control system being operable during gear shifting of said automatic transmission effected when said accelerator pedal has been stepped on, for changing output torque of said engine to reduce a shock generated during said gear shifting, the control system comprising:

engine output torque-calculating means for calculating a required output torque of said engine for performing said gear shifting, based on a gear shifting duration from a time said gear shifting is started to a time hydraulic pressure for operating a clutch of a lower-speed position of said clutches to be selected by said gear shifting rises;

torque correction amount-calculating means for calculating a torque correction amount, based on a difference between said required output torque of said engine calculated by said engine output torque-calculating means and actual output torque of said engine assumed during said gear shifting; and engine output torque-increasing means for increasing said output torque of said engine when said gear shifting is started, based on said torque correction amount calculated by said torque correction amount-calculating means.

2. A control system as claimed in claim 1, wherein said engine output torque-calculating means calculates said required output torque of said engine, based on a rotational speed of said engine and traveling speed of said vehicle assumed at the start of said gear shifting.

3. A control system as claimed in claim 1, wherein said engine output torque-calculating means includes total inertia-calculating means for calculating a total inertia required for said gear shifting, said engine output torque-calculating means setting said required output torque of said engine to a value based on said total inertia calculated by said total inertia-calculating means, said gear shifting duration, and engaging forces of said clutch of said lower-speed position and a clutch selected before said gear shifting.

4. A control system as claimed in claim 3, wherein said automatic transmission has an input side and an output side, said total inertia-calculating means calculating said total inertia, based on a difference in rotational speed of said input side between before and after said gear shifting and a difference in said rotational speed of said engine between before and after said gear shifting.

5. A control system as claimed in claim 4, wherein said total inertia-calculating means calculates rotational speed of said output side of said automatic transmission, based on said traveling speed of said vehicle, calculates said difference in said rotational speed of said input side between before and after said gear shifting, based on said rotational speed of said output side and change gear ratios of said gear mechanism assumed before and after said gear shifting, and calculates said rotational speed of said engine assumed after said gear shifting, based on said rotational speed of said input side assumed after said gear shifting.

6. A control system as claimed in claim 3, wherein said engaging forces of said clutch and said clutch selected before said gear shifting is determined according to said traveling speed of said vehicle.

\* \* \* \* \*